July 8, 1947.  F. W. SIDE  2,423,524
VIBRATOR
Filed Dec. 1, 1941  4 Sheets-Sheet 1

INVENTOR.
FREDERICK W. SIDE
BY G. O. Spangenberg
ATTORNEY.

July 8, 1947.  F. W. SIDE  2,423,524
VIBRATOR
Filed Dec. 1, 1941  4 Sheets-Sheet 2

INVENTOR.
FREDERICK W. SIDE
BY *G. O. Spangenberg*
ATTORNEY.

July 8, 1947. F. W. SIDE 2,423,524
VIBRATOR
Filed Dec. 1, 1941 4 Sheets-Sheet 3

INVENTOR.
FREDERICK W. SIDE
BY C. B. Spangenberg
ATTORNEY.

July 8, 1947.  F. W. SIDE  2,423,524
VIBRATOR
Filed Dec. 1, 1941  4 Sheets-Sheet 4

INVENTOR.
FREDERICK W. SIDE
BY C.B. Spangenberg
ATTORNEY.

Patented July 8, 1947

2,423,524

UNITED STATES PATENT OFFICE 2,423,524

VIBRATOR

Frederick W. Side, Philadelphia, Pa., assignor to The Brown Instrument Company, Philadelphia, Pa., a corporation of Pennsylvania Application December 1, 1941, Serial No. 421,176

21 Claims. (Cl. 200—90)

This invention relates to electromagnetic switching means or vibrators.

The prime object of this invention is to provide an electromagnetic switching means or vibrator which can reliably over a long period of time switch small voltages such as are present in a potentiometer measuring and/or recording instrument.

More specifically an object of this invention is to provide improved electromagnetic means for operating the switching means.

Another object is to provide improved switching means operated by the electromagnetic means.

Other objects and advantages reside in the details of construction which will become apparent upon reference to the accompanying specification, claims and drawing.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Fig. 1 diagrammatically illustrates a measuring system in which the vibrators of this invention may be advantageously employed;

Fig. 2 diagrammatically illustrates one form of vibrator that may be utilized in the system of Fig. 1;

Fig. 3 diagrammatically illustrates another form of vibrator that may be utilized in the system of Fig. 1;

Fig. 4 diagrammatically illustrates another form of vibrator that may be utilized in the system of Fig. 1;

Fig. 15 is an enlarged end view of a modified contact carrying member of Fig. 11;

Figure 1:
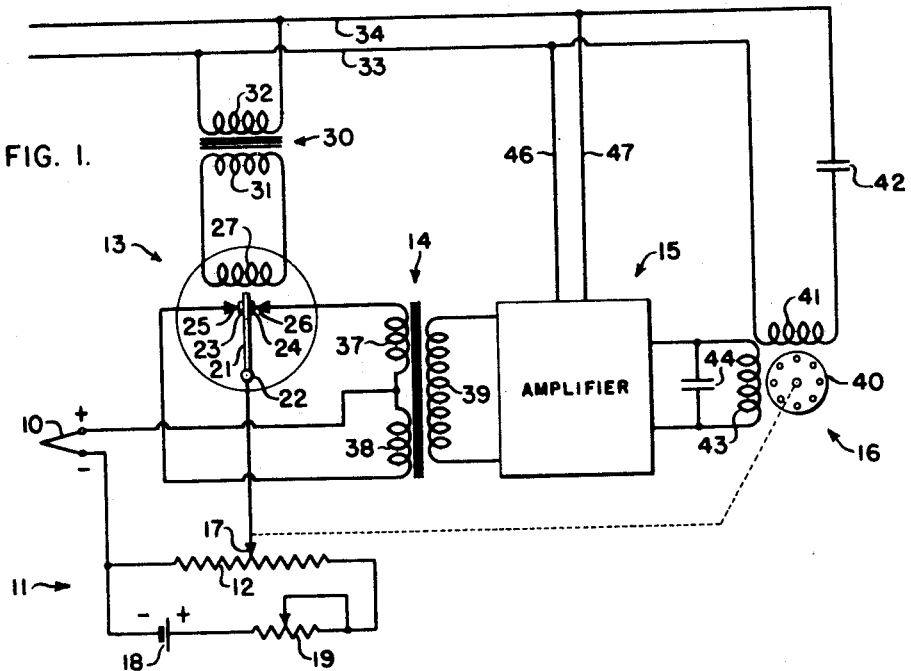

In Fig. 1 the vibrators of this invention are diagrammatically shown as applied to a measuring, recording and/or control apparatus which may be of the type shown, described and claimed in application Serial Number 421,173, filed by W. P. Wills on December 1, 1941. In Fig. 1, 10 designates a thermocouple responding to a condition such as a temperature condition within a furnace and which produces a D. C. or steady potential which corresponds directly with the temperature condition existing within the furnace. This D. C. potential produced by the thermocouple 10 is opposed by a D. C. or steady potential produced by a potentiometer circuit arrangement designated generally at 11 and including a slide-wire 12.

The differential D. C. or steady current produced by these opposed steady potentials is controlled by a vibrator generally designated at 13 and is applied to a transformer 14 to produce a fluctuating or alternating potential across the secondary of the transformer 14 which is of one phase or of opposite phase depending upon the direction of unbalance of the potentiometer circuit. This fluctuating or alternating potential across the secondary of the transformer 14 is amplified by an amplifier generally designated at 15 and the current output of the amplifier 15 is applied to a reversible electric motor generally designated at 16. The reversible electric motor 16 operates to position a contact 17 along the slide-wire 12. The electric motor 16 in addition to operating the contact 17 along the slide-wire 12 may also position indicating and/or recording means for indicating and/or recording the temperature at the thermocouple 10 and in addition may operate control apparatus for controlling a condition such as the temperature affecting the thermocouple 10. The contact 17 and the indicating, recording and/or control mechanism assume positions corresponding to the temperature condition existing within the furnace and to which the thermocouple 10 responds.

The potentiometer circuit arrangement includes a battery 18 and a standardizing resistance 19 for applying a D. C. or steady potential across the slide-wire 12 which is in opposition to the D. C. or steady potential produced by the thermocouple 10. When the contact 17 is moved to the right as shown in Fig. 1 the potential at contact 17 is increased and when the contact 17 is moved to the left it is decreased.

The vibrator 13 as diagrammatically shown in Fig. 1 includes a vibrating reed 21 carried by a support 22. The vibrating reed 21 carries a pair of contacts 23 and 24 which are adapted to engage and disengage contacts 25 and 26 upon movement of the vibrating reed. When the vibrating reed 21 is stationary and in the middle position contacts 23 and 24 engage the contacts 25 and 26 and as the vibrating reed is operated, one and then the other contact 23 and 24 disengage their respective contacts 25 and 26. The contacts may be resiliently mounted to provide this operation. The vibrator 13 includes a coil 27 for operating the vibrating reed. Power is supplied to the coil 27 by means of a transformer 30 having a secondary 31 connected to the coil 27 and a primary 32 connected across line wires 33 and 34 leading from some source of alternating potential and current, not shown.

The transformer 14 includes a pair of primaries 37 and 38 and a secondary 39, the secondary 39 being connected to the amplifier 15. The upper end of the primary 37 is connected to the contact 26 and the lower end of the primary 38 is connected to the contact 25. The adjacent ends of the primaries 37 and 38 are connected to the positive element of the thermocouple 10. The negative element of the thermocouple 10 is connected to the left end of the slide-wire 12 and the contact 17 engaging the slide-wire 12 is connected to the vibrating reed 21.

The reversible electric motor 16 is shown to be a rotating field type motor having a rotor 40 provided with conductor bars and a power winding 41 serially connected with a condenser 42 across the line wires 33 and 34. The condenser 42 is so selected with respect to the field winding 41 as to produce a resonant circuit to cause the current flow through the power winding 41 to be approximately in phase with the alternating potential of the line wires 33 and 34 while permitting the alternating voltage across the power winding 41 to lead the current by substantially 90 degrees. The reversible electric motor 16 also includes a control winding 43 connected to the output of the amplifier 15. A condenser 44 is connected in parallel with the control winding 43 to provide a resonant circuit so that the alternating or fluctuating potential across the control winding 43 leads the current through the control winding 43 by substantially 90 degrees. Power is supplied to the amplifier 15 from the line wires 33 and 34 by wires 46 and 47, respectively. Since the details of the amplifier 15 are disclosed in the above referred to Walter P. Wills application a further description in this application is not considered necessary.

Assume now that during the first half cycle of the alternating potential applied to the line wires 33 and 34 the potential of the wire 33 is positive with respect to the potential of the wire 34 and that during the second half cycle the opposite conditions are true. Assume also that during the first half cycle the vibrating reed 21 is moved to the right to cause the contact 24 to engage the contact 26 and the contact 23 to disengage the contact 25 and that during the second half cycle the vibrating reed 21 is moved to the left to cause the contact 23 to engage the contact 25 and the contact 24 to disengage the contact 26. When the potentiometer circuit is balanced, that is when the contact 17 is at a position corresponding to the value of the temperature condition within the furnace so that the potential of the contact 17 is equal to that of the positive element of the thermocouple 10, no current flows in the potentiometer circuit and, therefore, no fluctuating or alternating potential is produced across the secondary 39 of the transformer 14. Under these conditions the current flow through the control winding 43 of the reversible electric motor 16 is relatively uniform and the reversible electric motor 16 remains stationary.

Assume now that the temperature within the furnace increases to cause the potential of the positive element of the thermocouple 10 to increase above that of the contact 17. During the first half cycle of the alternating source this unbalanced current will flow upwardly through the primary 37 and through contacts 26 and 24 and through vibrating reed 21 to cause the upper end of the secondary 39 of the transformer 14 to be positive with respect to the lower end. During the second half cycle this unbalanced current will flow downwardly through the transformer primary 38 and through contacts 25 and 23 and vibrating reed 21 to cause the upper end of the secondary 39 to become negative with respect to the lower end. Accordingly a fluctuating or alternating potential is produced across the secondary 39 to cause the potential of the upper end of the secondary 39 to fluctuate in phase with the line voltage across the line wires 33 and 34. This fluctuating or alternating potential across the secondary 39 is amplified by the amplifier 15 and produces an alternating or fluctuating current flow in the control winding 43 which leads the current flow through the power winding 41 by substantially 90 degrees. This causes rotation of the reversible electric motor 16 in a direction to move the contact 17 to the right. When the contact 17 is moved sufficiently far to the right so that the potential thereof corresponds to the potential of the positive element of the thermocouple 10 the potentiometer circuit becomes balanced and rotation of the reversible electric motor 16 is stopped. The contact 17, therefore, assumes a position which is representative of the temperature condition then existing within the furnace.

Assume now that the temperature within the furnace decreases so that the potential of the positive element of the thermocouple 10 becomes less than the potential of the contact 17. During the first half cycle current flows through the vibrating reed 21 and contacts 24 and 26 downwardly through the primary 37 to cause the upper end of the secondary 39 to be negative with respect to the lower end. During the second half cycle current flows through the vibrating reed 21 and contacts 23 and 25 upwardly through the primary 38 to cause the upper end of the secondary 39 to be positive with respect to the lower end. Accordingly, an alternating or fluctuating potential is produced across the secondary 39 to cause the potential of the upper end thereof to alternate or fluctuate 180° out of phase with the line wires 33 and 34. This alternating or fluctuating potential across the secondary 39 is amplified by the amplifier 15 to produce a current flow through the control winding 43 of the reversible motor 16 which lags the current flow through the power winding 41 by substantially 90°. This causes the reversible motor 16 to operate in the opposite direction to move the contact 17 to the left to decrease the potential thereof. When the contact 17 is moved sufficiently far to the left so that the potential thereof corresponds to the potential of the positive element of the thermocouple 10 the potentiometer circuit becomes balanced and operation of the reversible electric motor 16 is stopped.

The successful operation of the above outlined system disclosed in Fig. 1 is dependent upon proper synchronizing of the vibrator 13 with respect to the voltage alternations of the line wires 33 and 34. In other words, it is necessary to always cause the vibrating reed 21 to move to the right during the first half cycle when the potential of the line wire 33 is positive with respect to the potential of the line wire 34 and to cause the vibrating reed 21 to move to the left during the second half cycle when the potential of the line wire 33 is negative with respect to the potential of the line wire 34.

Figure 2:
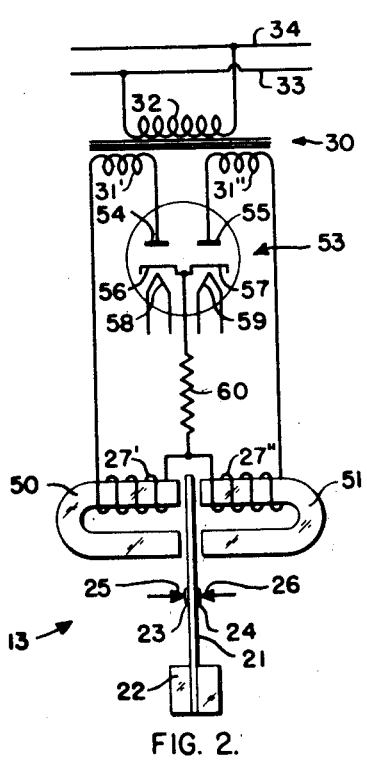
Figure 3:
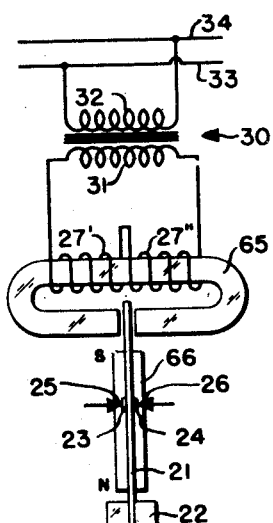
Figure 4:
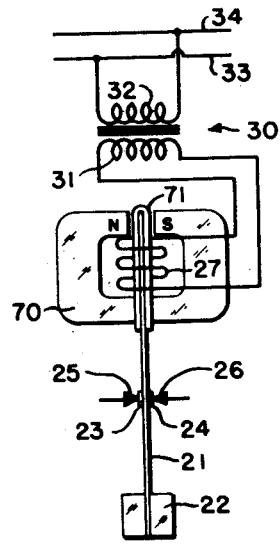

Figs. 2, 3 and 4 disclose schematically three types of vibrators which are properly synchronized for performing the desired mode of operation.

Referring now to Fig. 2 the vibrator 13 in addition to including the vibrating reed 21 and contacts 23, 24, 25 and 26 also includes iron cores 50 and 51 disposed on opposite sides of the vibrating reed 21. The coil 27 comprises a coil 27' associated with the iron core 50 and a coil 27" associated with the iron core 51. When the coil 27' is energized a flow of flux is produced in the core 50 to attract the reed 21 to the left to cause the contacts 23 and 25 to engage and the contacts 24 and 26 to disengage. When the coil 27" is energized a flow of flux is produced in the core 51 to attract the reed 21 to the right to cause the contacts 24 and 26 to engage and the contacts 23 and 25 to disengage.

The coils 27' and 27" are controlled by a rectifier arranged including the transformer 30 provided with a pair of secondary windings 31' and 31" and a rectifying tube 53 having a pair of plates 54 and 55, a pair of cathodes 56 and 57 and a pair of cathode heaters 58 and 59. The cathode heaters 58 and 59 may be supplied with energy from any suitable source, not shown. The plate 54 is connected to the right end of the transformer secondary winding 31' and the left end of the secondary winding 31' is connected to the left end of the coil 27' of the vibrator. The plate 55 is connected to the left end of the transformer secondary winding 31" and the right end thereof is connected to the right end of the coil 27" of the vibrator. The adjacent ends of the coils 27' and 27" are connected together and through a resistance 60 to the cathodes 56 and 57. The rectifier arrangement is, therefore, a full wave rectifier for producing a substantially steady D. C. potential across the resistance 60 which may be utilized if so desired for supplying D. C. current to the amplifier 15.

During the first half cycle of the alternating potential applied to the line wires 33 and 34 it is assumed that the left ends of the transformer secondary windings 31' and 31" are positive. Current will then flow from the left end of the secondary winding 31" through the plate 55, cathode 57, resistance 60 and coil 27" back to the right end of the secondary winding 31". This moves the vibrating reed 21 to the right to cause the contacts 24 and 26 to engage and the contacts 23 and 25 to disengage. During the first half cycle no current flows through the coil 27' so that the vibrating reed 21 is positively attracted to the right. During the second half cycle the right ends of the transformer secondaries 31' and 31" are positive. During the second half cycle current flows from the right end of the secondary 31' through the plate 54, cathode 56, resistance 60 and coil 27' back to the left end of the secondary 31'. This causes the vibrating reed 21 to be attracted to the left to cause the contacts 23 and 25 to engage and the contacts 24 and 26 to disengage. During the second half cycle no current flows through the coil 27" and, therefore, the vibrating reed 21 is positively attracted to the left. By reason of this rectifying arrangement as shown in Fig. 2 the operation of the vibrating reed 21 is at all times positively synchronized with respect to the alternations of the potentials of the line wires 33 and 34. The arrangement of Fig. 2 is shown, described and claimed in application Serial Number 421,174, filed by Walter P. Wills on December 1, 1941, which became Patent No. 2,375,158 on May 1, 1945, and, therefore, a further description of Fig. 2 is not considered necessary.

Fig. 3 shows another way of synchronizing the operation of the vibrator so that the vibrating reed 21 moves to the right during the first half cycle and to the left during the second half cycle. Coils 27' and 27" are connected in series to form a substantially continuous coil which receives current from the secondary 31 of the transformer 30. A single coil may be used to equal advantage. The serially connected coils 27' and 27" are mounted on a core 65 and the upper end of the vibrating reed 21 is controlled by the flux passing through the core 65. A permanent magnet 66 having a south pole adjacent the movable end of the reed 21 and a north pole at the other end is utilized for magnetizing the vibrating reed 21 so that the upper end of the vibrating reed, as shown in Fig. 3, is always a south pole. During the first half cycle the left end of the transformer secondary 31 becomes positive with respect to the right end to cause flux to flow in the core 65 to make that portion of the core 65 to the right of the vibrating reed 21 a north pole and that portion to the left a south pole. The north pole of the core 65 attracts the south pole of the reed 21 and the south pole of the core 65 repels the south pole of the reed 21 to move the reed to the right to cause the contact 24 to engage the contact 26 and the contact 23 to disengage the contact 25. During the second half cycle the right end of the secondary 31 of the transformer becomes positive with respect to the left end whereby the flux flow through the core 65 is reversed. The left side of the core 65 then becomes a north pole and the right side then becomes a south pole and these north and south poles act in conjunction with the south pole of the reed 21 to move the reed 21 to the left to cause the contact 23 to engage the contact 25 and the contact 24 to disengage the contact 26. The magnet 66 which magnetizes the reed 21 accordingly insures that the reed 21 will vibrate in synchronism with the supply voltage. Instead of utilizing the permanent magnet 66 the reed itself may be permanently magnetized for obtaining the synchronizing operation.

In Fig. 4 a permanent magnet 70 and an armature 71 carried by the reed 21 is utilized for synchronizing the operation of the vibrating reed 21. Here the coil 27 surrounds the armature 71 carried by the reed 21. The permanent magnet 70 is so arranged that the portion thereof to the left of the armature 71 is a north pole and the portion thereof to the right is a south pole. During the first half cycle the left end of the secondary 31 of the transformer becomes positive with respect to the right end which causes the upper end of the armature 71 to become a north pole and the lower end a south pole. The north pole of the armature 71 during the first half cycle cooperates with the north and south poles of the permanent magnet 70 to move the vibrating reed 21 to the right to cause the contact 24 to engage the contact 26 and the contact 23 to disengage the contact 25. During the second half cycle the right end of the secondary 31 becomes positive with respect to the left end which in turn causes the upper end of the armature 71 to become a south pole and the lower end a north pole. The south pole of the upper end of the armature 71 cooperates with the north and south poles of the permanent magnet 70 to move the vibrating reed 21 to the left to cause the contact 23 to engage the contact 25 and the contact 24 to disengage the contact 26.

Since the vibrators disclosed in this application have particular utility in connection with a potentiometer system as illustrated in Fig. 1 which requires the switching of very small voltages, the details of construction of the various vibrators are extremely important. While the vibrators of this application have been specifically designed for use in a potentiometer system of the type shown in Fig. 1, they may of course be utilized with some modification for switching larger voltages.

Figure 5:
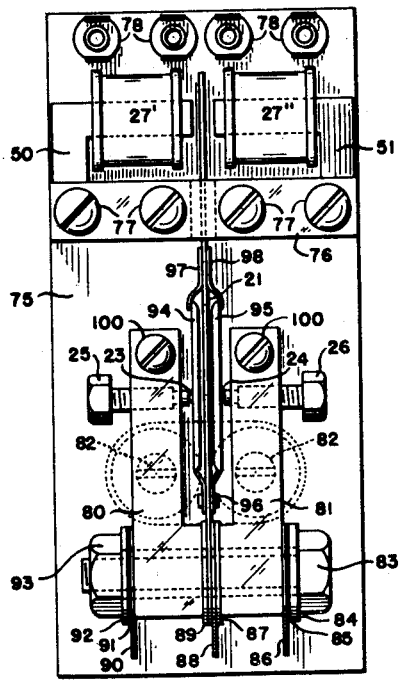
Fig. 5 is a front elevational view of a vibrator which may be of the type diagrammatically shown in Fig. 2.
Figure 6:
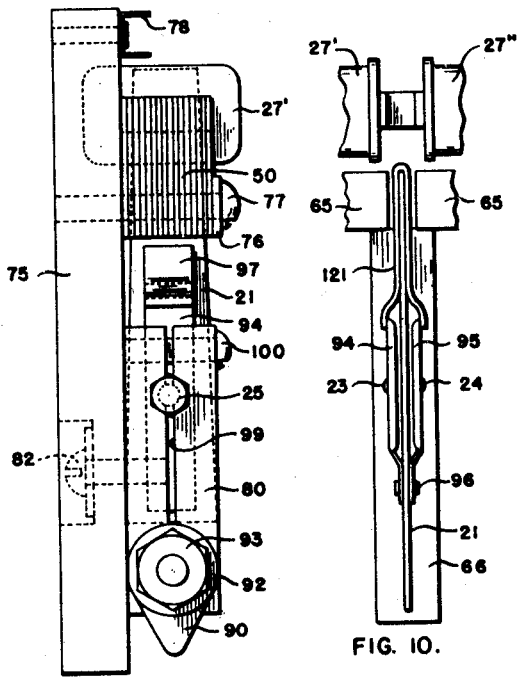
Fig. 6 is a side elevational view of Fig. 5.

Figs. 5 and 6 illustrate in more detail the vibrator shown diagrammatically in Fig. 2. The laminated cores 50 and 51 carrying the coils 27' and 27'', respectively, are secured to a base 75 preferably made of insulating material by means of a plate 76 and screws 77. Terminals 78 carried by the base 75, may be utilized for facilitating connections to the coils 27' and 27''. An auxiliary assembly comprising members 80 and 81 is secured to the base 75 by means of screws 82. The various component parts of the auxiliary assembly are secured together by a screw 83 and a nut 93 and these parts comprise a washer 84, an insulating washer 85, connecting tab 86, member 81, insulating washer 87, connecting tab 88, vibrating reed 21, insulating washer 89, member 80, connecting tab 90, insulating washer 91 and washer 92. By tightening the nut 93 these various component parts of the auxiliary assembly may be securely clamped together.

Spring members 94 and 95 which carry the contacts 23 and 24, respectively, are secured to the vibrating reed 21 by a rivet 96. Outward movement of the spring members 94 and 95 is limited by the stops 97 and 98 rigidly secured to the reed 21. The spring members 94 and 95 are channeled part way for rigidity. Preferably the contacts 23 and 24 are made of palladium silver. The contacts 25 and 26 are shown to be screws carried by the members 80 and 81, these screws being carried in a slot 99 formed in the members 80 and 81. After the screws 25 and 26 are properly adjusted with respect to the contacts 23 and 24, screws 100 are tightened to securely clamp the contact screws 25 and 26 in place. Preferably the ends of the contact screws 25 and 26 carry a thin plate of iridium platinum for engagement with the palladium silver contacts 23 and 24. During operation of the vibrator a pronounced wiping action takes place at the contacts.

The contacts 25 and 26 are normally adjusted so that when the reed 21 is in the middle position contacts 23 and 24 engage contacts 25 and 26. When the vibrating reed 21 is moved to the right the contact 23 disengages the contact 25 and when the vibrating reed moves to the left the contact 24 disengages the contact 26. Such an adjustment is desirable when the vibrator is utilized in a potentiometer system of the type shown in Fig. 1 so that the D. C. potential of the potentiometer circuit is never entirely interrupted but is applied either to one or the other of the primaries 37 and 38 of the transformer 14. By reason of this adjustment of the contacts 25 and 26 wear at the contacts will not appreciably affect the operation of the potentiometer system.

By making the contacts of different material, particularly of the material specified, the life of the contacts is materially increased, a clean condition at the point of contact is at all times maintained and the performance of the contacts remains substantially uniform over long periods of operation. When two hard contacting surfaces are used it is found that each tends to wear the other and that a hard granular residue appears between the surfaces. This granular residue remains between the contacts even in the presence of a strong wiping action thereby increasing the wear of both contact surfaces. This granular residue also provides high contact resistance of an unstable character which is not suitable for switching small voltages with any degree of precision. When two relatively soft contacting surfaces are used it is found that there is appreciable wear and severe cutting or scoring of the contact surfaces.

These difficulties are overcome by the use of different materials for the contacts. The iridium platinum surface of one of the contacts is highly polished to present an extremely smooth and hard surface to the mating contact. The palladium silver surface of the other contact is somewhat softer and after a number of engagements with the hard shiny iridium platinum surface assumes a similar finish which decreases wear to a minimum thereby promoting long life to the contacts. The residue which is produced by the contacting of the contacts emanates primarily from the softer contact surface and instead of being granular and abrasive in form is relatively plastic. The wiping action of the contacts immediately removes the residue from between the contacting surfaces which also provides long life of the contacts as well as self cleaning the contacts for optimum performance. Any wear that does take place, takes place at the palladium silver surface and does not destroy the reference surface of the iridium platinum contact. When the contacts are originally adjusted the iridium platinum surfaces form the reference surfaces. The symmetry of adjustment of the two sets of contacts, therefore, remains the same over long periods of operation to provide uniform operation.

Figure 7:
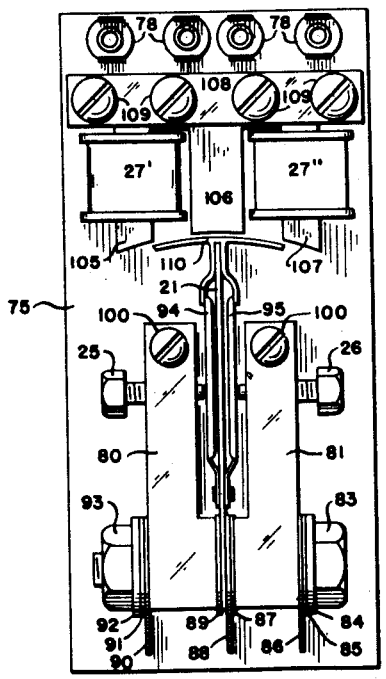
Fig. 7 is a front elevational view of a modification of Fig. 5.

Fig. 7 illustrates a modification of the arrangement of Figs. 5 and 6. Instead of the laminated cores 50 and 51 of Fig. 5, Fig. 7 utilizes a single laminated core structure having legs 105 and 106 and 107, the coil 27' being mounted on the leg 105 and the coil 27" being mounted on the leg 107. The laminated core structure is secured to the base 75 by means of a plate 108 and screws 109. The auxiliary assembly including the members 80 and 81 is exactly the same as the auxiliary assembly of Fig. 5 and like reference numbers for like parts have been utilized. The vibrating reed 21 of Fig. 7 carries an armature 110 constructed on a radius and the armature 110 cooperates with the ends of the legs 105, 106 and 107. The armature 110 also acts as stops for restraining the movement of the spring members 94 and 95. When the coil 27" is energized the armature 110 and the vibrating reed 21 are moved to the right and when the coil 27' is energized the armature 110 and reed 21 are moved to the left.

Figure 8:
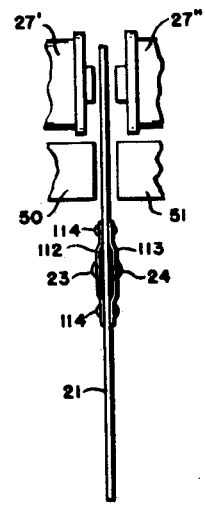
Fig. 8 is a partial front elevational view of a modification of Fig. 5.

Fig. 8 shows a further modification of Fig. 5 and is exactly the same as Fig. 5 with the exception of the members which carry the contacts 23 and 24. In Fig. 8 the contacts 23 and 24 are carried by spring members 112 and 113, respectively, which are suitably riveted to the vibrating reed 21 by rivets 114. The operation of the contacts of Fig. 8 is substantially the same as the operation of the contacts of Fig. 5.

Figure 9:
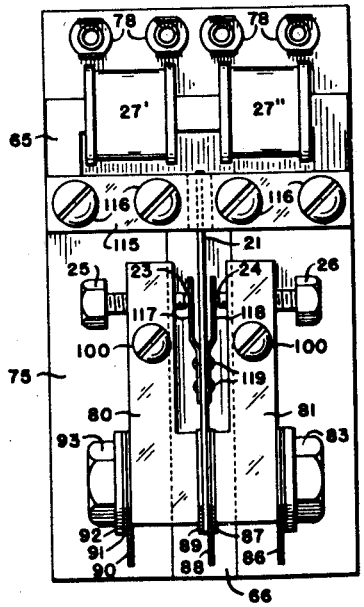
Fig. 9 is a front elevational view of a vibrator which may be of the type diagrammatically shown in Fig. 3.

Fig. 9 illustrates in more detail the vibrator diagrammatically shown in Fig. 3. In Fig. 9 the laminated core 65 is secured to the base 75 by means of a plate 115 and screws 116. The core 65 carries the coils 27' and 27" and suitable terminals 78 carried by base 75 may also be utilized for facilitating connections to the coils 27' and 27". As pointed out above a single coil may be utilized in lieu of the two coils 27' and 27" as shown in Fig. 9. The auxiliary assembly including the members 80 and 81 is for all intents and purposes the same as the auxiliary assembly shown in Figs. 5 and 7 and, therefore, a further description of this auxiliary assembly is not considered necessary. The vibrating reed 21 carries a pair of relatively short, stiff spring members 117 and 118 which are suitably secured to the vibrating reed 21 by rivets 119. The contacts 23 and 24 are carried by the spring members 117 and 118, respectively, and cooperate with the stationary contacts 25 and 26. The operation of the contacts of Fig. 9 is substantially the same as the operation of the contacts of Fig. 5. The permanent magnet 66 is imbedded in the base 75 immediately adjacent the vibrating reed 21 so that the permanent magnet 66 operates to polarize the vibrating reed 21 to perform the operation outlined above in connection with Fig. 3. As pointed out above the same operation could be obtained by magnetizing the vibrating reed 21, and eliminating the magnet 66.

Figure 10:
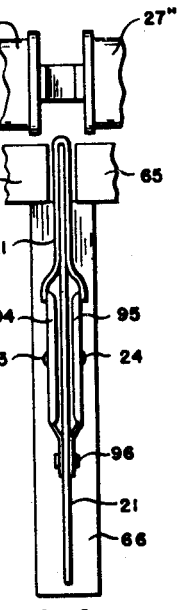
Fig. 10 is a partial front elevational view of a modification of Fig. 9.

Fig. 10 shows a modification of the arrangement of Fig. 9 the main distinction being the construction of the members which carry the contacts 23 and 24. This construction is substantially the same as the construction of Figs. 5 and 7. Here spring members 94 and 95 carrying the contacts 23 and 24 are secured to the vibrating reed 21 by a rivet 96. The armature 121 which is polarized by the magnet 66 or which may be permanently magnetized cooperates with the core 65 for synchronizing the operation of the vibrator. Armature 121 also operates as a stop for the spring members 94 and 95.

The spring members carrying the contacts 23 and 24 shown in Fig. 9 could be utilized in Figs. 5 and 7 and also the spring members carrying contacts 23 and 24 shown in Fig. 8 could be utilized in the arrangement of Fig. 9. All of the above described vibrators may be provided with suitable covers to protect them from dirt and corrosive atmospheres.

Figure 11:
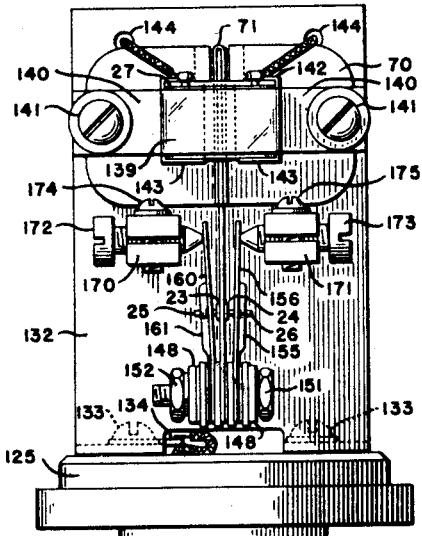
Fig. 11 is a front elevational view with the cover removed of a vibrator which may be of the type diagrammatically shown in Fig. 4.
Figure 12:
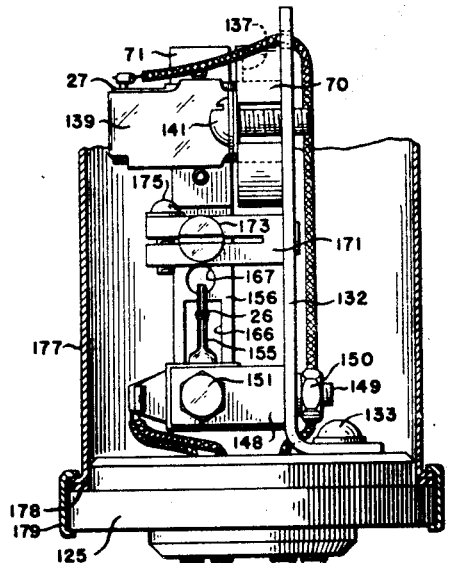
Fig. 12 is a side elevational view of Fig. 11 with a portion of the cover shown in section.
Figures 13, 16:
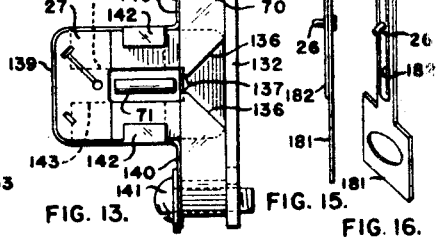
Fig. 13 is a top view of a portion of Figs. 11 and 12.
Fig. 16 is an enlarged perspective view of Fig. 15.

Figs. 11 to 13 show in more detail the vibrator schematically shown in Fig. 4. Referring more specifically to Figs. 11 and 12 a base preferably formed of insulating material is shown at 125 and secured to this base are six terminals 126, 127, 128, 129, 130 and 131 which adapt the vibrator for mounting in a conventional tube socket. The various electrical connections from the vibrator are made through these terminals. A supporting plate 132 is secured to the base 125 by means of screws 133. One of the screws 133 carries a tab 134 which is suitably electrically connected to the terminal 131 for grounding the plate 132 and the various parts carried thereby. The magnet 70 is carried by the plate 132 and this magnet may be formed of aluminum, nickel and cobalt in proportions commonly termed "Alnico." Referring to Fig. 13 it is seen that the magnet 70 is tapered at 136 for the purpose of concentrating the flux of the magnet at 137 adjacent the armature 71. The coil 27 formed in a Bakelite mold extends into the opening of the magnet 70 and is held in place by a bracket 139. The bracket 139 is preferably formed of soft steel and is provided with ears 140 for mounting purposes. Screws 141 extend through the ears 140 and through suitable openings in the magnet 70 for holding the bracket 139, the coil 27 and the magnet 70 in place on the plate 132. The bracket 139 is provided with relatively short ears 142 and relatively long ears 143 for clamping the coil 27 rigidly in place. The relatively long ears 143 cooperating with the remainder of the bracket 139 operate to provide a flux path for the flux produced by the coil 27 and to shield the rest of the vibrator from the magnetic strays produced by the coil 27. The plate 132 is provided with openings 144 for accommodating wires which connect the coil 27 to the terminals 129 and 130.

Figure 14:
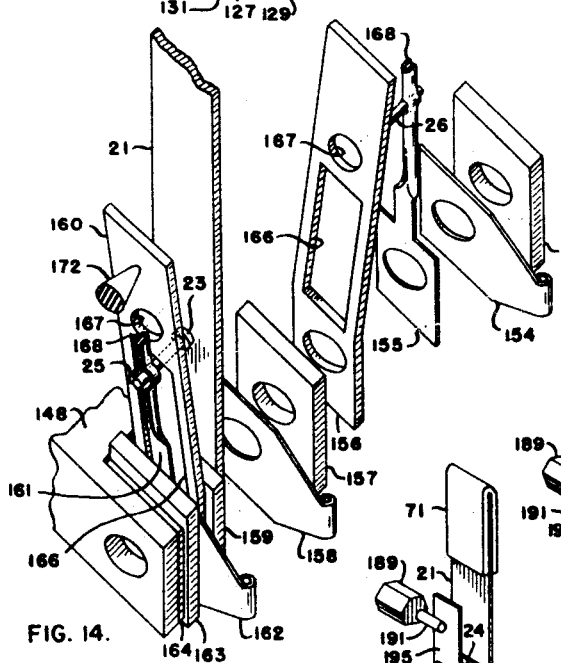
Fig. 14 is an enlarged exploded view of the contacts and cooperating members of Fig. 11.

A bifurcated stud 148 having a screw threaded extension 149 extending through an opening in the plate 132 is held in place on the plate 132 by a nut 150 cooperating with the screw threaded extension 149. The bifurcated end of the stud 148 includes a stacking more clearly shown in Fig. 14. The stacking is held in place in the bifurcated stud 148 by means of a screw 151 and a cooperating nut 152. The stacking as shown in Fig. 14 includes an insulating washer 153, a connecting tab 154, a spring contact member 155, a spring stop 156, an insulating washer 157, a connecting tab 158, the vibrating reed 21, an insulating washer 159, a spring stop 160, a spring contact member 161, a connecting tab 162, an insulating washer 163 and a shim or spacer 164. These various parts are all clamped in the bifurcation of the stud 148 by the screw 151 and the nut 152. A sleeve formed of insulating material mounted on the screw 151 insulates the stacking from the screw 151. The insulating washers 153, 157, 159 and 163 are preferably made of mica. The spring contact members 155 and 161 are preferably made of beryllium copper tempered. The spring stops 156 and 160 are preferably made of spring brass and the vibrating reed 21 is preferably made of beryllium copper tempered. The connecting tabs 154, 158 and 162 are preferably made of cadmium plated copper and as noted in Fig. 14 these connecting tabs are turned over at the ends to facilitate electrical connections. The tab 154 acts as a terminal for the spring contact member 155, the tab 158 acts as a terminal for the vibrating reed 21 and the tab 162 acts as a terminal for the spring contact member 161. The tabs 162, 158, and 154 are, respectively, connected to the terminals 126, 127 and 128. The spring stops 156 and 160 are provided with a circular opening 167 and a rectangular opening 168. The upper ends of the spring contact members 155 and 161 are channeled as shown at 168 and the contacts 26 and 25 extend through openings in the spring contact members 155 and 161 and are held in place in the channel. When the contacts 26 and 25 are suitably positioned in the channels, they are soldered in place, the soldered connection between the contacts and the channels forming a rigid and stable mounting for the contacts 26 and 25. The channel arrangement 168 also limits all pivotal or bending movement in the spring contact members 155 and 161 to the flattened portion below the channel. The vibrating reed 21 carries the contacts 23 and 24 which engage and disengage the contacts 25 and 26 carried by the spring contact members 161 and 155, respectively. The contacts 25 and 26 extend through the rectangular openings 166 of the spring stops 156 and 160.

A pair of bifurcated studs 170 and 171 are riveted to the plate 132 and screw threadedly mounted in the bifurcations of these studs are adjustable stops 172 and 173, respectively. Preferably these adjustable stops 172 and 173 are formed of an insulating material such as "Isolantite." Screws 174 and 175 may be tightened for clamping the "Isolantite" screws in their adjusted positions. The upper end of the reed 21 carries the armature 71 which may be formed of "Armco" iron or Swedish steel.

When the vibrator is assembled as shown in Figs. 11 and 12 the spring stops 160 and 156 are engaging the adjustable stops 172 and 173 and the channel portions 168 of the spring contact members 161 and 155 are engaging the spring stops 160 and 156 between the openings 167 and 166. The contacts 25 and 26 both engage the contacts 23 and 24 when the vibrating reed 21 is in the middle position. By adjusting the adjustable stops 172 and 173 the positions of the contacts 25 and 26 with respect to the contacts 23 and 24 may be adjusted.

As the vibrating reed 21 moves to the right contact 23 disengages contact 25 and contact 24 causes the channel portion 168 of the spring contact member 155 to disengage the spring stop 156. When the vibrating reed 21 moves to the left the same operation in reverse order takes place. The channel portion 168 has substantially the same contact surface with the spring stop 156 as the surface of the contact 26 with the contact 24 so that wear on the contact 26 and on the channel portion 168 will be substantially the same. The wear on the channel portion 168 compensates for the wear on the contact 26 so that the contacts 24 and 26 keep their same relative positions and readjustment of the contact 26 with respect to the contact 24 after a long period of operation is not necessary. The same is true for the contacts 23 and 25 and the channel portion 168 of the spring contact member 161. Due to the fact that bending of the spring contact members 155 and 161 must take place below the channel portion 168 the movement of the contacts 25 and 26 when engaged by the contacts 23 and 24 is limited to an arc whereby reliable operation is assured and a good wiping action at the contacts is provided. Preferably the contacts 23 and 24 are formed of iridium platinum and the contacts 25 and 26 are formed of a palladium silver to provide improved operation as pointed out above in connection with Fig. 5.

During the operation of the vibrator of Fig. 11 the armature 71 cooperates with the concentrated flux at the point 137 of the magnet 70. Changing of the upper end of the armature 71 from a north pole to a south pole by the operation of the coil 27 is enhanced by the ears 143 of the bracket 139 and the bracket 139 itself and this taken in conjunction with the concentrated flux of the magnet at 137 provides a very efficient mode of operation.

The operating parts of the vibrator mechanism are preferably sealed within a casing 177 a portion of which is shown in Fig. 12. The casing 177 engages a gasket 178 which may be made of cork for hermetically sealing the operating parts in the casing 177. A clamping ring 179 secures the casing 177 and gasket 178 to the base 125.

Figs. 15 and 16 show a modified form of spring contact member. Here the spring contact member is shown at 181 and is provided with a different type of channel 182. The purpose of the channel 182 in Figs. 15 and 16 is to strengthen the spring contact member and to limit the bending movement of the spring contact member 181 to a point below the channel. The spring contact members 181 of Figs. 15 and 16 may be substituted for the spring contact members 155 and 161 of Fig. 11.

Figure 17:
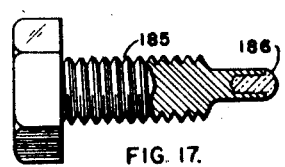
Fig. 17 is an enlarged elevational view partly in section of a modified part of Fig. 11.

Instead of utilizing "Isolantite" stops 172 and 173 of Fig. 11 a modified stop such as shown in Fig. 17 may be used. In Fig. 17 this modified stop comprises a metal screw 185 which may be screw threadedly mounted in the studs 170 and 171. The metal screw 185 is drilled out at one end and a glass gob 186 is suitably secured in the drilled out portion. The glass gob acts as the stop for the spring stop members 160 and 156 and also acts as an insulating material in the same way that the "Isolantite" stops 172 and 173 act.

Figures 18, 20:
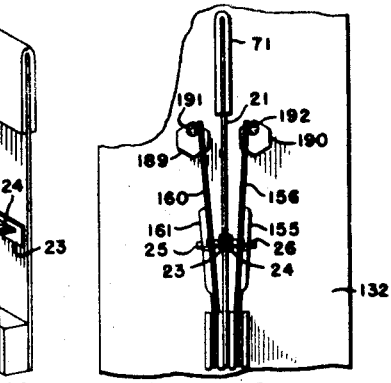
Fig. 18 is a partial front elevational view of a modification of Fig. 11.
Fig. 20 is an enlarged perspective view of a modified portion of Fig. 18.

Fig. 18 illustrates a modification of Fig. 11 the only difference being the type of adjustable stops utilized for adjusting the spring stops 160 and 156. These adjustable stops comprise screws 189 and 190 carrying pins 191 and 192 eccentrically located thereon and provided with suitable insulation. By rotating the screws 189 and 190 the pins 191 and 192 are laterally positioned for adjusting the positions of the spring stops 160 and 156.

Figure 19:
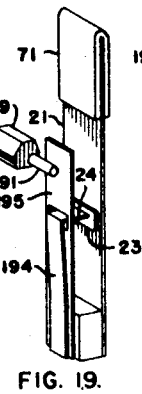
Fig. 19 is an enlarged perspective view of a modified portion of Fig. 18.

Fig. 19 illustrates a modified form of contact arrangement. The vibrating reed 21 carries an elongated contact 23 which is engaged by an elongated contact 24 formed on a spring member 194. The purpose of the elongated contacts 23 and 24 is to present a large contact area but still being sufficiently small in depth to prevent foreign material from lodging therebetween.

Fig. 20 is substantially the same as Fig. 19 with the exception that the spring member 194 is formed of a plurality of strips as shown at 196. The contact 24, therefore, is formed of a plurality of smaller contacts all spring biased into engagement with the contact 23 thereby assuring complete contact throughout its entire surface with the contact 23.

Figure 21:
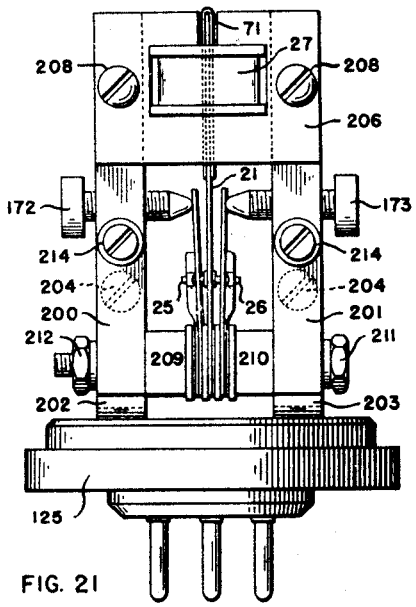
Fig. 21 is a front elevational view of a vibrator which may be of the type diagrammatically shown in Fig. 4.
Figure 22:
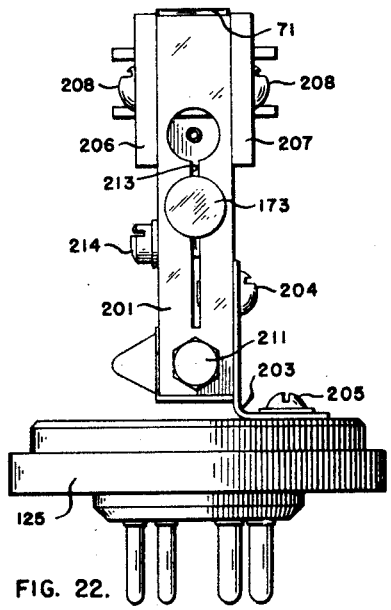
Fig. 22 is a side elevational view of Fig. 21.

Figs. 21 and 22 show a modified arrangement of a vibrator of the type schematically shown in Fig. 4 and shown in more detail in Fig. 11. A pair of posts 200 and 201 carry brackets 202 and 203 by means of screws 204 and the brackets 202 and 203 are secured to the base 125 by screws 205. The upper ends of the posts 200 and 201 carry a pair of magnets 206 and 207 and screws 208 secure the magnets to the posts. The coil 27 is carried by the magnets 206 and 207 and the armature 71 of the vibrating reed 21 operates within the coil 27 and between the magnets 206 and 207. The stacking which is exactly the same as the stacking in Fig. 11 is carried between the posts 200 and 201 by spacers 209 and 210 the parts being held in assembled relation by a screw 211 and a cooperating nut 212. The posts 200 and 201 are provided with a slot 213 in which are adjustably mounted the adjustable stops 172 and 173. Screws 214 mounted in the posts 200 and 201 clamp the adjustable stops 172 and 173 in their adjusted positions. The vibrator of Figs. 21 and 22 operates in substantially the same manner as the vibrator of Fig. 11 and, therefore, a further description is not considered necessary.

Figure 23:
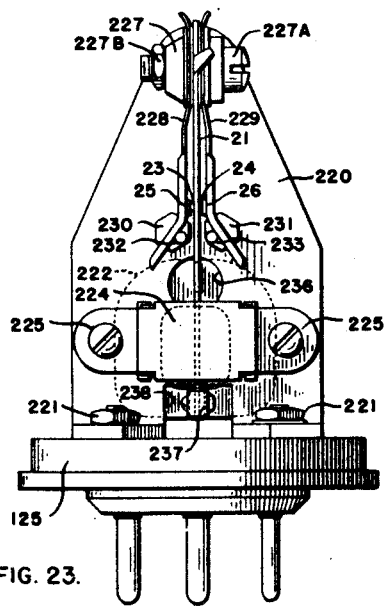
Fig. 23 is a front elevational view of a vibrator which may be of the type diagrammatically shown in Fig. 4.

In Fig. 23 a plate 220 is secured to the base 125 by nuts 221 cooperating with studs carried by the base. A magnet 222 is mounted on one side of the plate 220 by a screw 223 and the coil 27 is mounted on the other side of the plate 220. The coil 27 is carried by a bracket 224 which is suitably secured to the plate 220 by means of screws 225. The upper end of the plate 220 carries a bifurcated stud 227 held in place by a nut 227'. The bifurcated stud 227 carries the vibrating reed 21 and spring contact members 228 and 229 the members being electrically separated by suitable insulating washers. The parts are clamped together in the stud 227 by a screw 227A and a cooperating nut 227B. The spring contact members 228 and 229 carry the contacts 25 and 26, respectively, which cooperate with the contacts 23 and 24 carried by the vibrating reed 21. Screws 230 and 231 carry eccentrically located pins 232 and 233 which are utilized for the purpose of adjusting the contacts 25 and 26 with respect to the contacts 23 and 24.

Figure 24:
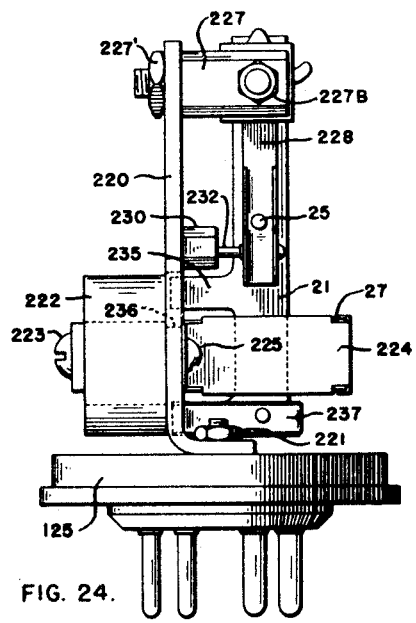
Fig. 24 is a side elevational view of Fig. 23.

The vibrating reed 21 is provided with an extension 235 which extends through an opening 236 in the plate 220 to a point adjacent the magnet 222. The lower end of the vibrating reed 21 is provided with an armature 237 which extends through an opening 238 in the plate 220 to a point adjacent the magnet 222. During one half cycle the armature 237 becomes a north pole and during the other half cycle it becomes a south pole and cooperates with the north and south poles of the magnet 222 to cause vibrating reed 21 to operate. The extension 235 of the vibrating reed 21 assists in completing the path for the magnet flux. The operation of the vibrators of Figs. 23 and 24 is substantially the same as those of Figs. 4, 11 and 21 and, therefore, a further description is not considered necessary.

While in accordance with the provisions of the statutes, I have illustrated and described the best form of this invention now known to me, it will be apparent to those skilled in the art that changes may be made in the form of the apparatus disclosed without departing from the spirit of this invention as set forth in the appended claims, and that in some cases certain features of this invention may sometimes be used to advantage without a corresponding use of other features.

Having now described my invention what I claim as new and desire to secure by Letters Patent is:

1. In combination, a relatively stationary contact, a movable contact for engaging and disengaging at frequent intervals the relatively stationary contact, one of the contacts being provided with a polished platinum iridium surface, and the other contact being provided with a palladium silver surface which mates precisely with the polished platinum iridium surface upon repeated engagement therewith.

2. In combination, a relatively stationary contact, a movable contact for engaging and disengaging at frequent intervals the relatively stationary contact, means for resiliently mounting one of the contacts to provide a wiping action as the contacts engage and disengage, one of the contacts being provided with a polished platinum iridium engaging surface, and the other contact being provided with a palladium silver engaging surface which mates precisely with the polished platinum iridium surface upon repeated engagement therewith.

3. In combination, a relatively stationary contact, a movable contact for engaging and disengaging at frequent intervals the relatively stationary contact, means for adjusting one of the contacts with respect to the other, one of the contacts being provided with a polished platinum iridium engaging surface, and the other contact being provided with a palladium silver engaging surface which mates precisely with the polished platinum iridium surface upon repeated engagement therewith.

4. In combination, a relatively stationary contact, a movable contact for engaging and disengaging the stationary contact, electromagnetic means for operating the movable contact at frequent intervals, one of the contacts being provided with a polished platinum iridium engaging surface, and the other contact being provided with a palladium silver engaging surface which mates precisely with the polished platinum iridium surface upon repeated engagement therewith.

5. In combination, a pair of relatively stationary contacts, a pair of movable contacts for engaging and disengaging at frequent intervals the pair of relatively stationary contacts, means for independently adjusting the contacts of the relatively stationary pair with respect to the pair of movable contacts, one pair of contacts being provided with polished platinum iridium engaging surfaces, and the other pair being provided with palladium silver engaging surfaces which mate precisely with the polished platinum iridium engaging surfaces upon repeated engagement therewith.

6. In combination, a relatively stationary contact, a movable contact for engaging and disengaging at frequent intervals the relatively stationary contact, a spring arm fixed at one end and carrying the relatively stationary contact near the other end and biased to move the relatively stationary contact toward the movable contact and to permit movement of the relatively stationary contact in the opposite direction when it is engaged by the movable contact, and a stop for limiting the movement of the spring arm and the relatively stationary contact toward the movable contact, the contacting surfaces of the spring arm and the stop being so related to the contacting surfaces of the relatively stationary contact and the movable contact that the wear at the contacting surfaces is substantially the same whereby the relative positions of the relatively stationary contact and the movable contact remain substantially the same regardless of wear.

7. In combination, a relatively stationary contact, a movable contact for engaging and disengaging at frequent intervals the relatively stationary contact, a spring arm fixed at one end and carrying the relatively stationary contact near the other end and biased to move the relatively stationary contact toward the movable contact and to permit movement of the relatively stationary contact in the opposite direction when it is engaged by the movable contact, and a stop for limiting the movement of the spring arm and the relatively stationary contact toward the movable contact, said spring arm being ribbed throughout a portion of its length to strengthen the ribbed portion and to limit bending of the spring arm to the unribbed portion whereby a wiping action is produced between said movable and relatively stationary contacts.

8. In combination, a pair of relatively stationary contacts, a pair of movable contacts for engaging and disengaging at frequent intervals the pair of relatively stationary contacts, a pair of spring arms fixed at one end and each carrying one of the pair of relatively stationary contacts near the other end and biased to move the relatively stationary contacts toward the movable contacts and to permit movement of the relatively stationary contacts in the opposite direction when they are engaged by the movable contacts, a pair of stops for limiting movement of the spring arms and the relatively movable contacts toward the movable contacts, the contacting surfaces of the spring arms and the stops being so related to the contacting surfaces of the relatively stationary contacts and the movable contacts that the wear at the contacting surfaces is substantially the same whereby the relative positions of the relatively stationary contacts and the movable contacts remain substantially the same regardless of wear.

9. In combination, a pair of relatively stationary contacts, a pair of movable contacts for engaging and disengaging at frequent intervals the pair of relatively stationary contacts, a pair of spring arms fixed at one end and each carrying one of the pair of relatively stationary contacts near the other end and biased to move the relatively stationary contacts toward the movable contacts and to permit movement of the relatively stationary contacts in the opposite direction when they are engaged by the movable contacts, a pair of stops for limiting movement of the spring arms and the relatively movable contacts toward the movable contacts, said spring arms being ribbed throughout a portion of their lengths to strengthen the ribbed portions and to limit bending of the spring arms to the unribbed portions whereby a wiping action is produced between said movable and relatively stationary contacts.

10. In combination, a pair of relatively stationary contacts, a pair of movable contacts for engaging and disengaging at frequent intervals the pair of relatively stationary contacts, a pair of spring arms fixed at one end and each carrying one of the pair of relatively stationary contacts near the other end and biased to move the relatively stationary contacts toward the movable contacts and to permit movement of the relatively stationary contacts in the opposite direction when they are engaged by the movable contacts, said spring arms being ribbed through a portion of their lengths to strengthen the ribbed portions and to limit bending of the spring arms to the unribbed portions whereby a wiping action is produced between said movable and relatively stationary contacts.

11. In combination, a resilient reed fixed at one end and movable at the other end, a permanent magnet located in its entirety alongside of the edge of the movable end of the resilient reed with its poles adjacent the movable end of the resilient reed, a coil surrounding the resilient reed adjacent its movable end for alternately reversing the polarity of the movable end of the resilient reed for vibrating the resilient reed, a contact remotely located from said permanent magnet and coil and carried by said resilient reed and moved thereby, a relatively stationary contact engaged and disengaged by the movable contact, a spring member carrying the relatively stationary contact and biased to move the relatively stationary contact toward the movable contact, a stop for limiting movement of the spring member and the contact toward the movable reed but permitting the movable contact to move the spring member and the relatively stationary contact in the opposite direction.

12. In combination, a resilient reed fixed at one end and movable at the other end, a permanent magnet located in its entirety alongside of the edge of the movable end of the resilient reed with its poles adjacent the movable end of the resilient reed, a coil surrounding the resilient reed adjacent its movable end for alternately reversing the polarity of the movable end of the resilient reed for vibrating the resilient reed, a contact remotely located from said permanent magnet and coil and carried by said resilient reed and moved thereby, a relatively stationary contact engaged and disengaged by the movable contact, a spring member carrying the relatively stationary contact and biased to move the relatively stationary contact toward the movable contact, a stop for limiting movement of the spring member and the contact toward the movable reed but permitting the movable contact to move the spring member and the relatively stationary contact in the opposite direction, and a member adjacent the coil for producing a low resistance path for the flux produced by the coil and for shielding the contacts from magnetic strays produced by the coil.

13. In combination, a relatively stationary contact, a movable contact for engaging and disengaging at frequent intervals the relatively stationary contact, one of the contacts being provided with a polished platinum iridium engaging surface and the other contact being provided with a palladium silver engaging surface which mates precisely with the polished platinum iridium surface upon repeated engagement therewith, a spring arm fixed at one end and carrying the relatively stationary contact near the other end and biased to move the relatively stationary contact toward the movable contact and to permit movement of the relatively stationary contact in the opposite direction when it is engaged by the movable contact, and a stop for limiting movement of the spring arm and the relatively stationary contact toward the movable contact.

14. In combination, a resilient reed fixed at one end and movable at the other end, a permanent magnet located in its entirety alongside of the edge of the movable end of the resilient reed with its poles adjacent the movable end of the resilient reed, a coil surrounding the resilient reed adjacent its movable end for alternately reversing the polarity of the movable end of the resilient reed for vibrating the resilient reed, a relatively stationary contact, a movable contact remotely located from said permanent magnet and coil and operated by the resilient reed for engaging and disengaging the relatively stationary contact.

15. In combination, a resilient reed fixed at one end and movable at the other end, a permanent magnet located in its entirety alongside of the edge of the movable end of the resilient reed with its poles adjacent the movable end of the resilient reed, a coil surrounding the resilient reed adjacent its movable end for alternately reversing the polarity of the movable end of the resilient reed for vibrating the resilient reed, a relatively stationary contact, a movable contact remotely located from said permanent magnet and coil and operated by the resilient reed for engaging and disengaging the relatively stationary contact, one of the contacts being provided with a polished platinum iridium engaging surface and the other contact being provided with a palladium silver engaging surface which mates precisely with the polished platinum iridium surface upon repeated engagement therewith.

16. In combination, a resilient reed fixed at one end and movable at the other end, a permanent magnet located in its entirety alongside of the edge of the movable end of the resilient reed with its poles adjacent the movable end of the resilient reed, a coil surrounding the resilient reed adjacent its movable end for alternately reversing the polarity of the movable end of the resilient reed for vibrating the resilient reed, a relatively stationary contact, a movable contact remotely located from said permanent magnet and coil and operated by the resilient reed for engaging and disengaging the relatively stationary contact, a spring arm fixed at one end and carrying the relatively stationary contact near the other end and biased to move the relatively stationary contact toward the movable contact and to permit movement of the relatively stationary contact in the opposite direction when it is engaged by the movable contact, and a stop for limiting movement of the spring arm and the relatively stationary contact toward the movable contact.

17. In combination, a resilient reed fixed at one end and movable at the other end, a permanent magnet located in its entirety alongside of the edge of the movable end of the resilient reed with its poles adjacent the movable end of the resilient reed, a coil surrounding the resilient reed adjacent its movable end for alternately reversing the polarity of the movable end of the resilient reed for vibrating the resilient reed, a relatively stationary contact, a movable contact remotely located from said permanent magnet and coil and operated by the resilient reed for engaging and disengaging the relatively stationary contact, one of the contacts being provided with a polished platinum iridium engaging surface and the other contact being provided with a palladium silver engaging surface which mates precisely with the polished platinum iridium surface upon repeated engagement therewith, a spring arm fixed at one end and carrying the relatively stationary contact near the other end and biased to move the relatively stationary contact toward the movable contact and to permit movement of the relatively stationary contact in the opposite direction when it is engaged by the movable contact, and a stop for limiting movement of the spring arm and the relatively stationary contact toward the movable contact.

18. In combination, a resilient reed fixed at one end and movable at the other end, a permanent magnet located in its entirety alongside of the edge of the movable end of the resilient reed with its poles adjacent the movable end of the resilient reed, a coil surrounding the resilient reed adjacent its movable end for alternately reversing the polarity of the movable end of the resilient reed for vibrating the resilient reed, the permanent magnet being reduced in cross section at the poles for concentrating the flux produced thereby at the movable end of the resilient reed, a relatively stationary contact, a movable contact remotely located from said permanent magnet and coil and operated by the resilient reed for engaging and disengaging the relatively stationary contact, one of the contacts being provided with a polished platinum iridium engaging surface and the other contact being provided with a palladium silver engaging surface which mates precisely with the polished platinum iridium surface upon repeated engagement therewith, a spring arm fixed at one end and carrying the relatively stationary contact near the other end and biased to move the relatively stationary contact toward the movable contact and to permit movement of the relatively stationary contact in the opposite direction when it is engaged by the movable contact, and a stop for limiting the movement of the spring arm and the relatively stationary contact toward the movable contact, said spring arm being ribbed throughout a portion of its length to strengthen the ribbed portion and to limit bending of the spring arm to the unribbed portion, the contacting surfaces of the spring arms and the stops being so related to the contacting surfaces of the relatively stationary contacts and the movable contacts that the wear at the contacting surfaces is substantially the same whereby the relative positions of the relatively stationary contacts and the movable contacts remain substantially the same regardless of wear, and a member adjacent the coil for producing a low resistance path for the flux produced by the coil and for shielding the contacts from magnetic strays produced by the coil.

19. In combination, a relatively stationary contact, a movable contact for engaging and disengaging the relatively stationary contact, electromagnetic means for operating the movable contact at frequent intervals, a spring arm fixed at one end and carrying the relatively stationary contact near the other end and biased to move the relatively stationary contact toward the movable contact and to permit movement of the relatively stationary contact in the opposite direction when it is engaged by the movable contact, and a stop for limiting the movement of the spring arm and the relatively stationary contact toward the movable contact, the contacting surfaces of the spring arm and the stop being so related to the contacting surfaces of the relatively stationary contact and the movable contact that the wear at the contacting surfaces is substantially the same whereby the relative positions of the relatively stationary contact and the movable contact remain substantially the same regardless of wear.

20. In combination, a relatively stationary contact, a movable contact for engaging and disengaging the relatively stationary contact, electromagnetic means for operating the movable contact at frequent intervals, a spring arm fixed at one end and carrying the relatively stationary contact near the other end and biased to move the relatively stationary contact toward the movable contact and to permit movement of the relatively stationary contact in the opposite direction when it is engaged by the movable contact, and a stop for limiting the movement of the spring arm and the relatively stationary contact toward the movable contact, said spring arm being ribbed throughout a portion of its length to strengthen the ribbed portion and to limit bending of the spring arm to the unribbed portion whereby a wiping action is produced between said movable and relatively stationary contacts.

21. In combination, a resilient reed fixed at one end and movable at the other end, a permanent magnet producing a magnetic field and arranged in its entirety in association with the movable end of the resilient reed, electromagnetic means including a coil located in its entirety adjacent the movable end of the resilient reed for creating an alternating magnetic field which reacts with that produced by the permanent magnet for vibrating the resilient reed, a relatively stationary contact, and a movable contact remotely located with respect to the magnetic fields produced by said permanent magnet and electromagnetic means and operated by the resilient reed for engaging and disengaging the relatively stationary contact.

FREDERICK W. SIDE.

REFERENCES CITED

The following references are of record in the file of this patent:

UNITED STATES PATENTS

| Number | Name | Date |
|---|---|---|
| 914,518 | Rolfe et al. | Mar. 9, 1909 |
| 960,920 | Howe | June 7, 1910 |
| 991,325 | Kitsee | May 2, 1911 |
| 1,048,670 | Fessenden | Dec. 31, 1912 |
| 1,166,129 | Heyl | Dec. 28, 1915 |
| 1,676,979 | Cheeseman | July 10, 1928 |
| 1,924,082 | Barrett | Aug. 22, 1933 |
| 2,205,315 | Stevens et al. | June 18, 1940 |
| 2,223,573 | Nulsen | Dec. 3, 1940 |
| 2,252,761 | Estes | Aug. 19, 1941 |
| 2,292,179 | Tubbs | Aug. 4, 1942 |

FOREIGN PATENTS

| Number | Country | Date |
|---|---|---|
| 339,037 | France | Sept. 12, 1904 |
| 412,209 | France | Aug. 17, 1910 |

---

Certificate of Correction

Patent No. 2,423,524.  July 8, 1947.

FREDERICK W. SIDE

It is hereby certified that error appears in the printed specification of the above numbered patent requiring correction as follows: Column 16, line 14, claim 10, after the word "contacts" and before the period insert *and a pair of adjustable stops for adjustably limiting movement of the spring arms and relatively stationary contacts toward the movable contacts*; and that the said Letters Patent should be read with this correction therein that the same may conform to the record of the case in the Patent Office.

Signed and sealed this 23rd day of September, A. D. 1947.

[SEAL]

THOMAS F. MURPHY,
*Assistant Commissioner of Patents.*